United States Patent
Naheiri

[19]

[11] Patent Number: 6,156,101
[45] Date of Patent: Dec. 5, 2000

[54] SINGLE BED PRESSURE SWING ADSORPTION PROCESS AND SYSTEM

[75] Inventor: Tarik Naheiri, Bath, Pa.

[73] Assignee: Air Products and Chemicals, Inc., Allentown, Pa.

[21] Appl. No.: 09/246,517

[22] Filed: Feb. 9, 1999

[51] Int. Cl.$^7$ .................................................. B01D 53/053
[52] U.S. Cl. ........................... 95/101; 95/102; 95/105; 95/130; 96/144
[58] Field of Search ..................... 95/96–98, 100–105, 95/130; 96/108, 130, 143, 144

[56] References Cited

U.S. PATENT DOCUMENTS

| | | | |
|---|---|---|---|
| 3,104,162 | 9/1963 | Skarstrom | 95/96 |
| 3,138,439 | 6/1964 | Skarstrom | 95/98 X |
| 3,186,150 | 6/1965 | Zankey | 96/130 X |
| 3,399,510 | 9/1968 | Kauer, Jr. et al. | 95/98 |
| 3,430,418 | 3/1969 | Wagner | 95/100 |
| 3,513,631 | 5/1970 | Seibert et al. | 96/130 X |
| 3,643,402 | 2/1972 | Wireman | 95/98 |
| 3,923,477 | 12/1975 | Armond et al. | 95/103 |
| 3,989,484 | 11/1976 | Hamrin, Jr. et al. | 95/98 |
| 4,065,272 | 12/1977 | Armond | 55/25 |
| 4,194,892 | 3/1980 | Jones et al. | 55/58 |
| 4,376,639 | 3/1983 | Vo | 95/101 |
| 4,376,640 | 3/1983 | Vo | 95/103 X |
| 4,404,005 | 9/1983 | Hamlin et al. | 96/130 X |
| 4,440,548 | 4/1984 | Hill | 95/100 |
| 4,477,264 | 10/1984 | Kratz et al. | 55/25 |
| 4,511,377 | 4/1985 | McCombs | 55/163 |
| 4,534,346 | 8/1985 | Schlaechter | 95/102 X |
| 4,561,865 | 12/1985 | McCombs | 55/25 |
| 4,732,579 | 3/1988 | Veltman et al. | 95/96 |
| 4,793,832 | 12/1988 | Veltman et al. | 95/96 X |
| 4,892,566 | 1/1990 | Bansal et al. | 55/26 |
| 5,032,150 | 7/1991 | Knaebel | 55/20 |
| 5,071,449 | 12/1991 | Sircar | 55/26 |
| 5,228,888 | 7/1993 | Gmelin et al. | 55/25 |
| 5,370,728 | 12/1994 | LaSala et al. | 95/101 |
| 5,415,683 | 5/1995 | Leavitt | 95/101 |
| 5,425,240 | 6/1995 | Jain et al. | 96/130 X |
| 5,486,226 | 1/1996 | Ross et al. | 95/96 X |
| 5,520,720 | 5/1996 | Lemcoff | 95/96 |
| 5,620,501 | 4/1997 | Tamhankar et al. | 95/96 X |
| 5,658,371 | 8/1997 | Smolarek et al. | 95/101 |
| 5,679,134 | 10/1997 | Brugerolle et al. | 95/96 |
| 5,772,737 | 6/1998 | Andreani et al. | 95/98 |
| 5,882,380 | 3/1999 | Sircar | 95/98 |

FOREIGN PATENT DOCUMENTS

| | | |
|---|---|---|
| 0771583 | 5/1997 | European Pat. Off. . |
| 09077502 | 3/1997 | Japan . |
| 10194708 | 7/1998 | Japan . |

OTHER PUBLICATIONS

Zhang, Zhixiong et al., "Separation of a Nitrogen–Carbon Dioxide Mixture by Rapid Pressure Swing Adsorption", Adsorption 4, 173–177, 1998, Kluwer Academic Publishers.

*Primary Examiner*—Robert H. Spitzer
*Attorney, Agent, or Firm*—John M. Fernbacher

[57] ABSTRACT

A PSA process and system utilizes a combination of cyclic feed, evacuation, purge, and repressurization steps to provide a final gas product enriched in one of the feed components. The process is carried out in a simple system which utilizes a single two-way four-port valve for controlling gas flow between an adsorber vessel and a blower, and the blower is used for the introduction of feed gas into the adsorber and the evacuation of gas from the adsorber. The control of gas flow in either direction between the adsorber vessel and a product gas storage tank is accomplished by two check valves installed in parallel between the vessel and the tank.

15 Claims, 2 Drawing Sheets

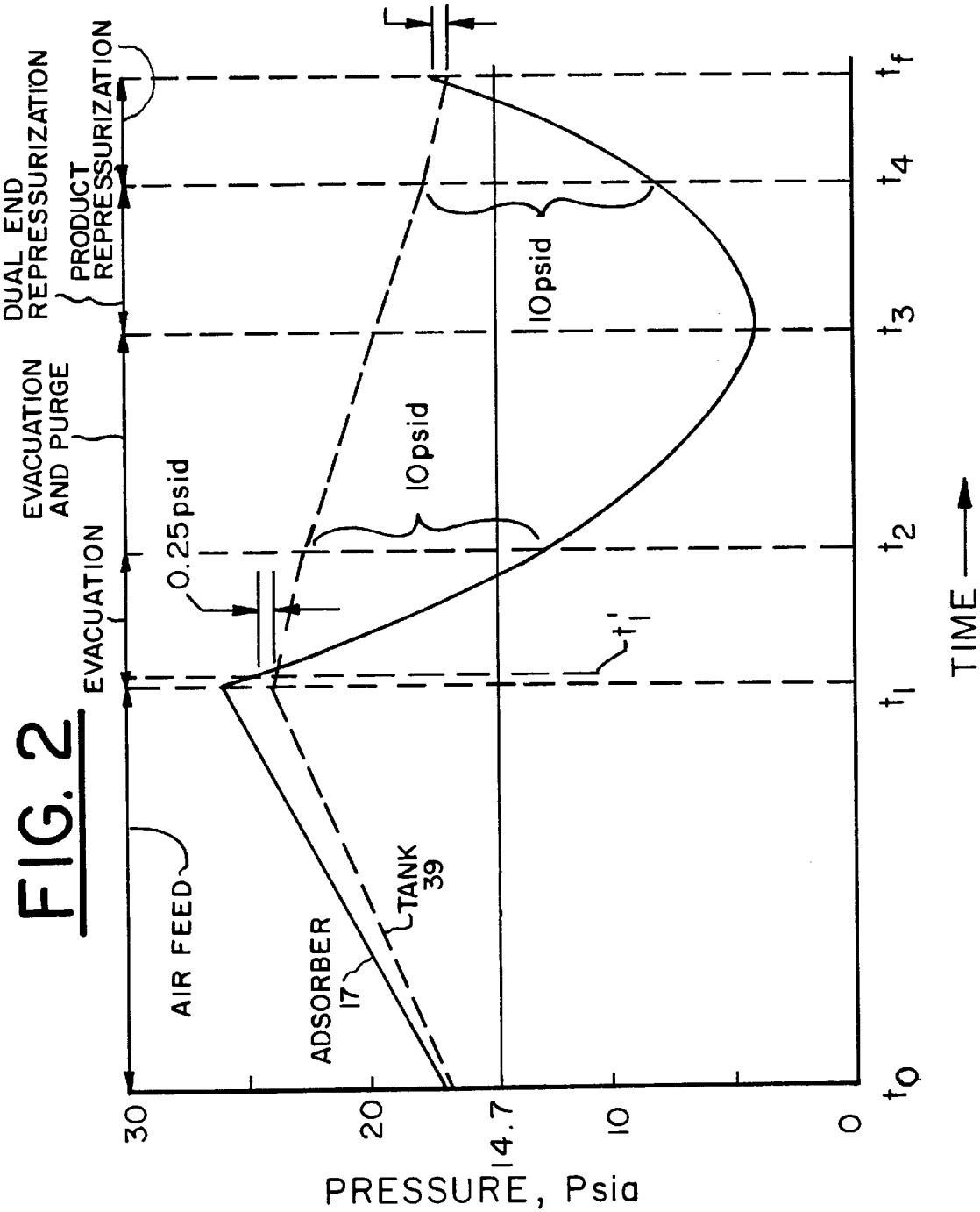

SINGLE BED PRESSURE SWING ADSORPTION PROCESS AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Pressure swing adsorption is a well-known method for the separation of bulk gas mixtures and for the purification of gas streams containing low concentrations of undesirable components. The method has been developed and adapted for a wide range of operating conditions, product purity, and product recovery. Many pressure swing adsorption systems utilize two or more adsorber beds operated in a cyclic sequence in order to maintain a constant product flow rate while selected beds undergo various steps including adsorption, depressurization, desorption, purge, pressure equalization, repressurization, and other related steps. Multiple adsorber beds using numerous process steps are required to achieve high purity and/or recovery of valuable gaseous products such as hydrogen, carbon oxides, synthesis gas, light hydrocarbons, and the like. The high cost of generating the feed gas mixtures containing these valuable components and the high purity requirements for certain products usually justify the complexity and capital expense of multiple-bed pressure swing adsorption systems.

A number of single-bed pressure swing adsorption (PSA) processes have been developed and are known in the art. Many of these processes operate partially at pressures below atmospheric and are described as vacuum swing adsorption (VSA) or vacuum-pressure swing adsorption (VPSA) processes. In the present specification, pressure swing adsorption (PSA) is used as a generic term to describe all types of cyclic adsorption systems regardless of operating pressure levels.

Other gaseous products amenable to recovery by PSA do not require the high purity and/or recovery of the above-named products. In the recovery of oxygen and nitrogen from air by PSA, for example, a lower purity product containing 90 to 95 vol % oxygen is acceptable for many end uses, and simpler PSA systems can be used to provide such a product. These simpler PSA systems have significantly lower capital and operating costs than the multiple-bed systems earlier described. The simplest of these PSA systems for air separation utilize a single adsorber bed in conjunction with one or more gas storage vessels to allow constant product flow and provide gas for adsorber purge and pressurization during the regeneration portion of the PSA cycle.

U.S. Pat. No. 4,561,865 discloses a single-bed PSA system comprising an adsorber and a surge tank operated with a feed compressor in a three-step cycle. First, compressed feed air is introduced into the adsorber, which increases the pressure in the adsorber, and simultaneously adsorber effluent is withdrawn into the surge tank. A portion of the gas is withdrawn from the surge tank as an oxygen-enriched product. The adsorber feed is then discontinued and the adsorber is vented countercurrently (i.e. through the adsorber feed end) to the atmosphere. During this venting step, purge gas from the surge tank is introduced into the product end of the adsorber. Upon completion of the vent/purge step, the adsorber and the surge tank are pressure equalized through the adsorber product end (i.e. countercurrently). The steps are repeated in a cyclic manner. U.S. Pat. No. 4,511,377 describes a modular apparatus using this PSA process.

A single-bed PSA system is described in U.S. Pat. No. 4,892,566 which utilizes an adsorber in conjunction with a surge tank, feed compressor, and switch valves to carry out a series of steps. First, compressed feed air is introduced into the adsorber, which increases the pressure in the adsorber while at the same time adsorber effluent is withdrawn into the surge tank. A portion of the gas is withdrawn from the surge tank as an oxygen-enriched product. The adsorber feed is discontinued and the adsorber outlet closed, and the adsorber is vented countercurrently (i.e. through the adsorber feed end) to the atmosphere. Gas from the surge tank is introduced into the adsorber countercurrently (i.e. through the adsorber product end) and the pressures in the adsorber and surge tank are equalized. The adsorber is then pressurized with feed air through the feed end and pressure equalized with the surge tank. The adsorber is further pressurized to a pressure above that of the surge tank, and finally the adsorber and surge tank are pressure equalized. The steps are then repeated in cyclic fashion.

U.S. Pat. No. 5,032,150 discloses a single-bed PSA process which utilizes multiple gas storage tanks in a PSA cycle to separate air. Compressed air is fed from an air feed tank into an adsorber presaturated with oxygen-rich gas from a previous cycle and the adsorber effluent is directed into a product collector tank, from which a portion of the gas is withdrawn as an oxygen-rich product. The adsorber outlet is then closed and the adsorber is pressure equalized with the air feed tank. Next, the adsorber is rinsed with nitrogen-rich gas from a nitrogen product tank, and the displaced gas is stored in the air feed tank. The nitrogen-saturated adsorber then is depressurized countercurrently (i.e. through the adsorber feed end) into the nitrogen product tank. Nitrogen may be withdrawn as a product if required. Finally the adsorber is purged countercurrently with oxygen-rich gas from the product collector tank to displace the nitrogen therein and then is pressurized countercurrently with the oxygen-rich gas to the adsorption pressure. The steps are repeated in a cyclic manner.

A single-vessel rapid PSA system is described in U.S. Pat. No. 5,071,449 in which the vessel contains dual adsorption layers and operates in alternating fashion with a continuous feed gas and two continuous product streams. A product surge tank is not used. Another rapid PSA system utilizing a single adsorbent bed operating in a cycle of 30 seconds or less is described in U.S. Pat. No. 4,194,892. The adsorber effluent optionally flows through a product surge tank to dampen flow fluctuations during adsorber cycling.

A single-bed PSA system with a product surge tank and an equalization tank is disclosed in U.S. Pat. No. 5,370,728. In the operation of this system, compressed air feed is introduced into the adsorbent bed, pressurizing the bed from an intermediate pressure up to a maximum adsorption pressure, and the effluent product is withdrawn from the bed into the product surge tank. The adsorbent bed then is isolated and depressurized cocurrently (i.e. through the product end) into an equalization tank at the intermediate pressure. Next, the bed is further depressurized countercurrently (i.e. through the feed end) to a lower desorption pressure, and the bed is purged countercurrently with gas from the product surge tank. The bed is then pressurized countercurrently to the intermediate pressure with gas from the equalization tank. Finally the bed is pressurized with feed air and the steps are repeated in a cyclic manner.

Other single-bed PSA processes are described in U.S. Pat. Nos. 4,065,272; 4,477,264; 5,228,888; 5,415,683; 5,658,371; 5,679,134; and 5,772,737; and in Japan Patent Application Kokai Nos. H9-77502 and H10-194708; and in European Patent Application EP 0 771 583 A1.

Several of the above-cited documents disclose multiple gas storage tanks to provide purge and repressurization gas. U.S. Pat. No. 5,370,728, U.S. Pat. No. 5,658,371, and European Patent Application EP 0 771 583 A1 describe the use of dual gas storage tanks in single-bed air separation systems for oxygen recovery. One tank stores void space gas or partial depressurization gas having lower oxygen purity and the other tank stores higher purity oxygen product gas. Stored gas having lower oxygen purity is used for partial repressurization of the adsorber while a portion of stored higher purity product gas is used for adsorber purging. U.S. Pat. No. 5,032,150 describes the recovery of nitrogen from air in a PSA system which uses multiple gas storage tanks, wherein one tank stores oxygen-rich gas for purging the adsorber and another tank stores nitrogen-rich product for displacing oxygen from the adsorber after purging is completed.

The PSA processes and systems described above provide for the efficient production of an enriched gaseous product from a feed gas mixture. These single-bed processes require multiple valves and appropriate control systems to control gas flow rate and flow direction during the cyclic adsorption, depressurization, evacuation, and repressurization steps. Future improvements will encourage the wider use of these single-bed processes and systems. Such improvements should include the simplification of equipment, particularly blowers, valves, and associated gas flow control systems which are required in these PSA processes. The invention described below and defined in the appended claims offers an improved PSA process and system in which the number of valves is minimized and gas flow control is greatly simplified compared with known PSA process technology.

BRIEF SUMMARY OF THE INVENTION

The invention is a pressure swing adsorption process for the separation of a pressurized feed gas containing at least one more strongly adsorbable component and at least one less strongly adsorbable component which comprises the steps of:

(a) introducing the pressurized feed gas at a feed pressure into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, and introducing at least a portion of the adsorber effluent gas into a gas storage tank;

(b) terminating introduction of the pressurized feed gas into the adsorber vessel and depressurizing the adsorber vessel by evacuating gas from the feed end of the adsorber vessel;

(c) continuing to evacuate gas from the feed end of the adsorber vessel while simultaneously introducing stored adsorber effluent gas from the gas storage tank into the product end of the adsorber vessel until the pressure in the adsorber vessel reaches a minimum adsorber pressure;

(d) terminating the evacuating of gas from the feed end of the adsorber vessel and repressurizing the adsorber vessel from the minimum adsorber pressure to an intermediate pressure by introducing pressurized feed gas into the feed end of the adsorber vessel while continuing to introduce stored adsorber effluent gas from the gas storage tank into the product end of the adsorber vessel;

(e) further repressurizing the adsorber vessel to the feed pressure by continuing to introduce pressurized feed gas into the feed end of the adsorber vessel; and (f) repeating steps (a) through (e) in a cyclic manner.

Final product gas can be obtained during step (a) by withdrawing a portion of the adsorber effluent gas enriched in the less strongly adsorbable component or alternatively by withdrawing a portion of the stored adsorber effluent gas from the gas storage tank. A portion of the stored adsorber effluent gas from the gas storage tank can be withdrawn as a final product gas during steps (b), (c), (d), and (e).

The feed gas can be air, wherein the more strongly adsorbable component is nitrogen and the less strongly adsorbable component is oxygen. The solid adsorbent can be selected from the group consisting of monovalent or bivalent cation-exchanged zeolites having type A, type X, or mordenite structure.

During step (a), the adsorber effluent gas preferably flows through a first check valve prior to introducing adsorber effluent gas into the gas storage tank. No gas flows from the gas storage tank through the first check valve into the adsorber vessel during steps (b), (c), (d), and (e).

During steps (c) and (d), gas preferably flows from the gas storage tank through a second check valve and into the adsorber vessel. No adsorber effluent gas flows through the second check valve during steps (a), (b), and (e). The minimum adsorber pressure typically is below atmospheric pressure.

The invention also includes a pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) blower, valve, and piping means for (1) introducing the feed gas into the feed end of the adsorber vessel and (2) withdrawing an evacuation gas from the feed end of the adsorber vessel;

(c) piping means for withdrawing an adsorber effluent gas enriched in the less strongly adsorbable component from the product end of the adsorber vessel;

(d) a gas storage tank for holding a portion of the adsorber effluent gas withdrawn from the product end of the adsorber vessel;

(e) piping means for introducing the portion of adsorber effluent gas into the gas storage tank and for transferring adsorber effluent gas from the gas storage tank into the adsorber vessel;

(f) a first check valve which allows adsorber effluent gas to flow into the gas storage tank only when the differential pressure between the adsorber vessel and the gas storage tank is equal to or greater than a differential opening pressure of the first check valve;

(g) a second check valve which allows gas to flow from the gas storage tank into the adsorber vessel only when the differential pressure between the gas storage tank and the adsorber vessel is equal to or greater than a differential opening pressure of the second check valve; and (h) piping means for withdrawing at least a portion of the adsorber effluent gas as a final product gas enriched in the less strongly adsorbable component. The valve means of (b) preferably comprises a two-way four-ported valve which:

(1) in a first valve position allows gas to flow in sequence through a feed inlet/outlet line, through the valve, through a blower suction line, through the blower, through a blower discharge line, through the valve, through a line connected to the adsorber vessel feed end, and into the adsorber vessel, and (2) in a second valve position allows gas to flow in sequence from the adsorber vessel, through the line connected to the adsorber vessel feed end, through the valve, through the blower suction line, through the blower, through the blower discharge line, through the valve, and through the feed inlet/outlet line.

The opening differential pressure of the first check valve preferably is between about 0.05 psid and about 1.0 psid, and the opening differential pressure of the second check valve preferably is between about 2 psid and about 10 psid.

Preferably, the system further comprises a flow control valve connected to the piping means for withdrawing at least a portion of the adsorber effluent gas as a final product gas enriched in the less strongly adsorbable component. The feed gas can be air, in which case the feed inlet/outlet line is in flow communication with the atmosphere.

BRIEF DESCRIPTION OF SEVERAL VIEWS OF THE DRAWINGS

FIG. 2 is a plot of adsorber and gas storage tank pressures vs. time for a process cycle of the present invention.

DETAILED DESCRIPTION OF THE INVENTION

Figure 1:
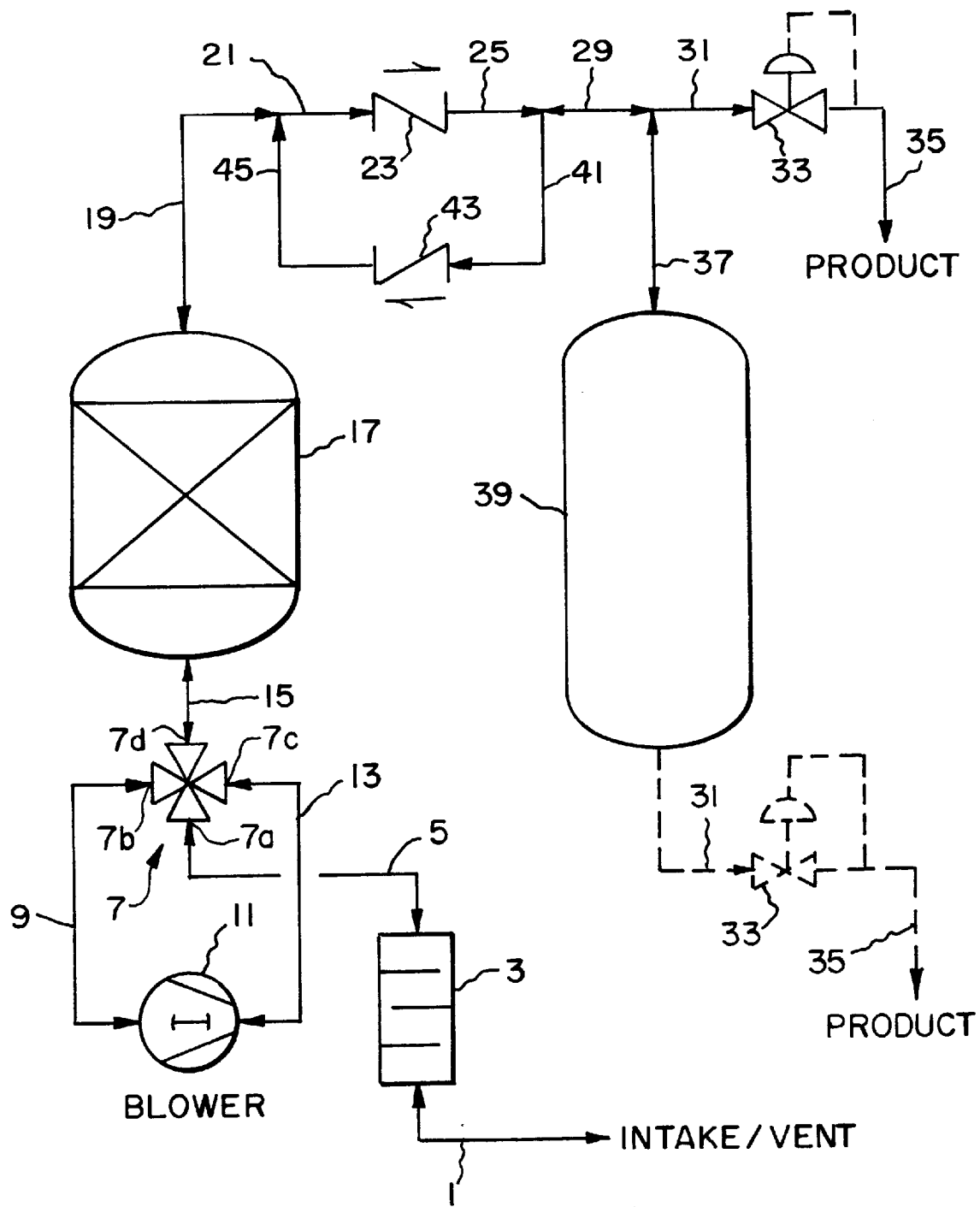
FIG. 1 is a schematic flow diagram of an embodiment of the present invention.

The present invention is a PSA process which utilizes a unique combination of cyclic feed, evacuation, purge, and repressurization steps to provide a final gas product enriched in one of the feed components. The process is carried out in a simple system which utilizes a single two-way four-port valve for controlling gas flow between an adsorber vessel and a blower, and the blower is used for the introduction of feed gas into the adsorber and the evacuation of gas from the adsorber. The control of gas flow in either direction between the adsorber vessel and a product gas storage tank is accomplished by two check valves installed in parallel between the vessel and the tank. The system thus functions with only two mechanical drivers—one for operating the two-way four-port valve and one for operating the blower. The check valves between the adsorber and the gas storage tank are activated directly and automatically by the gas differential pressure between the adsorber and the storage tank.

In the descriptions of the embodiments of the present invention given herein, the following meanings are associated with specific terms used.

A feed step occurs during the time in which pressurized feed gas is introduced into the adsorber vessel. Depressurization is defined as the withdrawal of gas from the adsorber vessel accompanied by decreasing adsorber pressure. Depressurization can be achieved by venting gas from a superatmospheric pressure directly to the atmosphere, or alternatively to another process vessel or enclosed volume which is at a lower pressure. Depressurization also can be achieved by evacuation, defined as the withdrawal of gas from the adsorber by mechanical means such as a vacuum pump or blower. Evacuation can be carried out over any range of adsorber pressures, but typically is carried out at subatmospheric pressures, i.e., under vacuum. Repressurization is defined as the introduction of gas into the adsorber vessel accompanied by increasing adsorber pressure.

Purge is defined as the introduction of a purge gas, typically product gas, into one end of the adsorber while an effluent gas is withdrawn from the other end of the vessel. Purge can be carried out at any pressure, but is most effective at subatmospheric pressures. Purge can be carried out during depressurization, evacuation, or repressurization, and thus the adsorber pressure may increase, decrease, or remain constant during any portion of a purge step. Preferably, as described below, purge is carried out during the latter portion of the depressurization or evacuation step.

Differential pressure (or alternatively pressure differential) is defined as the positive difference in gas pressure between a vessel or tank at a higher pressure and a vessel or tank at a lower pressure. Differential pressure also is defined as the positive difference in gas pressure between the inlet and outlet of a check valve. The opening differential pressure of a check valve is the difference in pressure between the inlet and outlet required to open the valve and allow gas flow from the inlet to the outlet.

Void space gas is defined as nonadsorbed gas contained within the interstitial or interparticle volume within the adsorber vessel, and includes gas in the piping and vessel dead volume which is not occupied by adsorbent.

A portion of the adsorber effluent gas from the adsorber vessel, which also can be defined as adsorber product gas, is stored in a product gas storage tank. Gas withdrawn for external consumption is defined as a final product gas (or alternatively a final gas product), and this final product gas can be supplied by withdrawal from the product gas storage tank or as a portion of the adsorber product gas.

The process of the present invention is carried out in the pressure swing adsorption system shown schematically in FIG. 1. Feed gas and waste evacuation gas (later defined) flow through intake/vent line 1 connected to silencer 3 which reduces the noise of gas intake and exhaust. Line 5, through which gas flows in either direction, is connected to two-way four-port valve 7 at inlet/outlet port 7a. Line 9, through which gas flows in either direction, connects inlet/outlet port 7b of two-way four-port valve 7 to blower 11. Line 13, through which gas flows in either direction, connects inlet/outlet port 7c of two-way four-port valve 7 to blower 11. Line 15, through which gas flows in either direction, connects inlet/outlet port 7d of two-way four-port valve 7 with the feed end of adsorber vessel 17.

Two-way four-port valve 7 can be any type of commercially-available two-way four-port valve which can be operated in two positions to direct gas in two flow directions. This valve typically is a four-ported ball valve with a double angle or double L ball actuated by means of an electric reversing motor actuator with brake. Valves and actuators suitable for such service are available commercially, and can be obtained for example from Pittsburgh Brass Manufacturing Co. and from the AMSCO Sales Corp.

Adsorber vessel 17 contains adsorbent material which selectively adsorbs one or more of the components in a feed gas mixture, thereby enriching the non-adsorbed gas in the remaining components as explained later. Line 19, through which gas flows in either direction, is connected to the product end of the adsorber vessel.

Line 21, through which gas flows in only one direction as shown, is connected to the inlet of check valve 23. Line 25, through which gas flows in only one direction as shown, is connected to the outlet of check valve 23. Check valve 23 allows flow only from adsorber vessel 17 to gas storage tank 39, in the direction shown, when the differential pressure between adsorber vessel 17 (the higher pressure) and gas storage tank 39 (the lower pressure) is equal to or greater than a predetermined value. This differential pressure is equivalent to the opening differential pressure of the check valve.

When the differential pressure is less than this value, check valve 23 is closed. This predetermined value of the differential pressure is typically between about 0.05 and 1.0 pounds per square inch differential (psid), and is set by the design of the specific check valve used in this service. Line 29, through which gas flows in either direction, is connected to line 31, through which gas flows to the inlet of control valve 33. Final product gas line 35 is connected to the outlet of control valve 33. Line 37, through which gas flows in either direction, is connected to line 29 and to gas storage tank 39.

Line 41, through which gas flows in only one direction as shown, is connected to the inlet of check valve 43. Line 45, through which gas flows in only one direction as shown, is connected to the outlet of check valve 43 and to line 19. Check valve 43 allows flow from gas storage tank 39 to adsorber vessel 17, in the direction shown, only when the differential pressure between gas storage tank 39 (the higher pressure) and adsorber vessel 17 (the lower pressure) is equal to or greater than a predetermined value. This is the opening differential pressure of the check valve. When the differential pressure is less than this value, check valve 43 is closed. This predetermined value of the differential pressure is typically between about 2.0 and 20 pounds per square inch differential (psid), and is set by the design of the specific check valve used in this service.

An alternative mode for the withdrawal of final product gas is given in FIG. 1 in which the product is withdrawn directly from gas storage tank 39 via line 31, valve 33, and product line 35 as shown.

The description of the process of the present invention which utilizes the system of FIG. 1 is given below. The process is illustrated by the recovery of oxygen from air, but the process can be used to separate other gas mixtures as explained later.

1) Air Feed

Atmospheric air, preferably filtered by known methods (not shown) to remove harmful particulate material, flows through intake/vent line 1, silencer 3, line 5, two-way four-port valve 7 via ports 7a and 7b, and line 9 into the inlet of blower 11. Blower 11, which typically is a rotary lobe Roots-type blower, compresses the air to a feed pressure typically in the range of 18 to 23 psia. An aftercooler (not shown) following the blower optionally can be used. Pressurized feed gas flows through line 13, two-way four-port valve 7 via ports 7c and 7d, and line 15 into adsorber vessel 17 containing adsorbent material which selectively adsorbs nitrogen, a more strongly adsorbed component in the air feed. Adsorber vessel 17 is initially at a typical intermediate pressure of about 14.5 to 15.5 psia as a result of a previous repressurization step (described below), and the pressures in adsorber vessel 17 and gas storage tank 39 are nearly equal except for the differential pressure required to keep check valve 23 open. Pressurized feed air increases the pressure in the adsorber vessel to the full adsorption pressure of about 18 to 23 psia over a period of about 13 to 30 seconds. Water present in atmospheric air can be removed upstream of adsorber vessel 17 by known methods, or alternatively can be removed by the use of a layer of adsorbent at the adsorber inlet end which preferentially adsorbs water.

As the pressurized air feed passes through the adsorber vessel, it is enriched in oxygen, a less strongly adsorbed component in the air feed. Oxygen-enriched adsorber effluent typically containing 85 to 95 vol % oxygen is withdrawn through line 19, line 21, check valve 23, and line 29. A portion of the adsorber effluent gas flows through line 37 into gas storage tank 39, and the remainder passes through flow control valve 33 and line 35 to provide a final oxygen product gas.

The air feed step continues until the adsorbent approaches a predetermined level of nitrogen breakthrough and before complete adsorption equilibrium with feed air is reached in the adsorber, at which time the step is terminated. The typical duration of the air feed step is about 13 to 30 seconds.

Adsorber vessel 17 contains one or more adsorbents which preferentially adsorb nitrogen and thus enrich the adsorber effluent in oxygen. These adsorbents can be selected from the group consisting of monovalent or bivalent cation-exchanged zeolites having type A, type X, or mordenite structure. Specific examples are NaX, NaA, CaX, and CaA type zeolites.

2. Evacuation

The air feed step is terminated by changing the position of two-way four-port valve 7 such that blower 11 evacuates adsorber vessel 17, whereby void space and desorbed gas from the adsorber flow through line 15, two-way four-port valve 7 via ports 7d and 7b, blower 11, and line 13. Shortly after the termination of the air feed step, check valve 23 automatically closes when the differential pressure between adsorber vessel 17 (the higher pressure) and gas storage tank 39 (the lower pressure) falls below a predetermined value in the range of about 0.05 to about 1.0 psid. Check valve 23 therefore is closed for most of the evacuation step. Evacuated gas flows through two-way four-port valve 7 via ports 7c and 7a, line 5, and silencer 3, and is vented to the atmosphere through inlet/vent line 1. Adsorber vessel 17 is countercurrently evacuated (i.e. in the opposite flow direction as the feed step), which desorbs nitrogen adsorbed during the air feed step, thereby partially regenerating the adsorbent for the next air feed step. Evacuation continues until an intermediate adsorber pressure of about 4 to 10 psia is attained.

3. Combined Evacuation and Purge

When the differential pressure between gas storage tank 39 (the higher pressure) and adsorber vessel 17 (the lower pressure) increases to a predetermined value between about 2 and 10 psid, check valve 43 automatically opens and oxygen-rich product gas flows from tank 39 into adsorber vessel 17 via lines 37, 29, 41, 45, and 19. This countercurrent flow of purge gas sweeps the adsorbent and further desorbs residual nitrogen. The purge gas admission rate is such that the pressure in adsorber vessel 17 continues to decrease. When a predetermined minimum adsorber pressure of between about 4 and 10 psia is reached, this combined evacuation and purge step is terminated. Typically, the duration of the step is between about 2 and 8 seconds. Termination of the step is effected by switching the position of two-way four-port valve 7 so that blower 11 is changed from the evacuation mode to the feed compression mode earlier described. If desired, the rate of purge gas supplied through check valve 43 and the switch time of valve 7 can be selected such that the combined evacuation and purge step is carried out for a period of time at the minimum adsorber pressure.

4. Dual-Ended Repressurization

Repressurization of adsorber vessel 17 is initiated by introducing compressed feed air through line 15 as earlier described in the air feed step. Air flows through intake/vent line 1, silencer 3, line 5, two-way four-port valve 7 via ports 7a and 7b, and line 9 into the inlet of blower 11. Blower 11 thus introduces feed air at an increasing pressure into adsorber vessel 17. Pressurized feed gas flows through line 13, two-way four-port valve 7 via ports 7c and 7d, and line 15 into adsorber vessel 17. Stored product gas from gas storage tank 39 continues to flow into the adsorber vessel through line 37, line 29, line 41, check valve 43, line 45, and line 19. When the differential pressure between gas storage tank 39 (the higher pressure) and adsorber vessel 17 (the lower pressure) decreases to the predetermined value between about 2 and 10 psid, check valve 43 automatically closes, and the dual-ended repressurization step ends. The duration of the dual-ended repressurization step typically is about 2 to 8 seconds.

5. Feed Repressurization

As pressurized air feed continues, the pressure in adsorber vessel increases to the feed pressure, at which time the cycle is repeated beginning with the air feed step described above. At the end of this step, check valve 23 opens and adsorber product effluent gas begins to flow through line 19, line 21, check valve 23, line 25, and line 29. Check valve 23 automatically opens when the differential pressure between adsorber vessel 17 (the higher pressure) and gas storage tank 39 (the lower pressure) exceeds the predetermined value in the range of 0.05 to 1.0 psid. A portion of the product gas flows via line 37 into gas storage tank 39 and the remainder is withdrawn as the final oxygen product gas via line 31, control valve 33, and line 35.

During steps 1 through 5 described above, final oxygen product gas is withdrawn continuously through valve 33 and line 35. During step 1, the total gas flow from adsorber vessel 17 through lines 19, 21, 25, and 29 provides gas to storage tank 39 via line 37 and final oxygen product gas via line 35. During steps 2 through 5, final oxygen product gas is withdrawn from gas storage tank 39 via lines 37 and 31. During steps 2, 3, and 4, product gas also is withdrawn from gas storage tank 39 via lines 37, 29, 41, 45, and 19 for adsorber vessel purge and repressurization. Gas storage tank 39 is designed to be of sufficient volume to provide purge and repressurization gas while providing final oxygen product gas at the required pressure and flow rate.

In an alternative embodiment of the invention, all adsorber effluent gas can be introduced via lines 29 and 37 into gas storage tank 39. Final product gas is withdrawn directly from gas storage tank 39 via line 31, valve 33, and product line 35 as shown. Gas for purge and repressurization of the adsorber is withdrawn via lines 37 and 29 as described above.

A summary of the PSA cycle described above is given in Table 1, which indicates the valve position and time duration for each cycle step for the cycle described above. A plot of the absolute pressures in adsorber vessel 17 and gas storage tank 39 as a function of time is shown in FIG. 2 in conjunction with the Example given below. The time axis of FIG. 2 is not necessarily to scale, and the lengths of the cycle steps shown are illustrative only.

TABLE 1

Cycle and Valve Position Summary
(Time Periods from Fig. 2)

| | | | Two-way four-port Valve 7 | Check Valves | |
|---|---|---|---|---|---|
| | Time | | Port | | |
| Cycle Step | Period | Sec. | Connections | 23 | 43 |
| 1) Air Feed | $t_0$–$t_1$ | 15–30 | 7a to 7b; 7c to 7d | O | C |
| 2) Evacuation | $t_1$–$t_2$ | 15–36 | 7d to 7b; 7c to 7a | C | C* |
| 3) Evacuation/Purge | $t_2$–$t_3$ | 2–8 | 7d to 7b; 7c to 7a | C | O |
| 4) Dual-end Repressurization | $t_3$–$t_4$ | 2–8 | 7a to 7b; 7c to 7d | C | O |
| 5) Feed Repressurization | $t_4$–$t_f$ | 2–8 | 7a to 7b; 7c to 7d | C | C |

Valve Position: O = Open  C = Closed  C* = closes slightly after step 2 begins
Total cycle time from $t_0$–$t_f$ is typically in the range of 36 to 94 seconds.

The PSA process cycle of the present invention is described above for the preferred application of air separation for oxygen production. The process cycle also can be used for the separation of other gas mixtures by using appropriate adsorbent(s) and cycle times. The process can be applied, for example, in the recovery of moderate purity hydrogen from petroleum refinery offgases, in the drying of air, and in the removal of heavier hydrocarbons from natural gas. Adsorbents useful for these separations include activated carbon, types A and X zeolites, and mordenite. The system as described utilizes a single adsorber, but multiple adsorbers can be used in parallel if higher production rates are required.

EXAMPLE

A PSA system according to FIG. 1 is operated to recover oxygen from air as described above and as summarized in Table 1. The minimum differential pressure between adsorber 17 and gas storage tank 39 required to allow flow through check valve 23 is 0.25 psid. Thus the opening differential pressure of check valve 23 is 0.25 psid. The minimum differential pressure between gas storage tank 39 and adsorber 17 required to allow flow through check valve 43 is 10 psid. Thus the opening differential pressure of check valve 43 is 10 psid.

The cycle is described in FIG. 2, which presents the pressure-time profile for adsorber vessel 17 and gas storage tank 39. The cycle and air feed step (1) begin at time at $t_0$ in which the initial pressure in adsorber vessel 17 is 17.0 psia. The gas flow through the system proceeds as described in air feed step (1) above and the valves operate in the positions summarized in Table 1. Since the minimum differential pressure required to maintain flow through check valve 23 is 0.25 psid, the pressure in gas storage tank 39 at $t_0$ is 0.25 psia lower than the pressure in adsorber vessel 17. The pressure in adsorber vessel 17 rises approximately linearly from $t_0$ to $t_1$ while the pressure in gas storage tank 39 rises more slowly because only a portion of the product gas in line 29 flows through line 37 into tank 39.

At time $t_1$ (20 seconds after $t_0$), when the adsorber pressure reaches 22 psia, the air feed step is terminated and the evacuation step is initiated by switching the position of feed valve 7 as described above. Blower 11 immediately begins to withdraw evacuation gas from adsorber vessel 17, and the pressure therein decreases rapidly. Shortly after time $t_1$, the differential pressure between adsorber 17 and tank 39 falls below 0.25 psid, and flow through check valve 23 stops. Evacuation proceeds and the pressure in adsorber 17 continues to decrease. At the same time, the final oxygen gas product is withdrawn from storage tank 39 via line 31, and the pressure in the tank decreases slowly.

At time $t_2$ (30 seconds after $t_1$), the evacuation step automatically terminates, and the combined evacuation and purge step begins when the differential pressure between gas storage tank 39 and adsorber 17 exceeds 10 psid. This initiates flow of oxygen product gas from tank 39 through check valve 43 and into adsorber vessel 17, thereby providing purge gas into the product end of the adsorber while evacuation continues from the feed end of the adsorber. The pressure in adsorber 17 continues to decrease, although at a slightly lower rate, and the pressure in storage tank 39 decreases more rapidly as both purge gas and final product gas are withdrawn therefrom.

At time $t_3$ (8 seconds after $t_2$), adsorber vessel 17 reaches a pressure of 4.0 psia and the evacuation/purge step is terminated by switching the position of two-way four-port valve 7 so that blower 11 is changed from the evacuation mode to the feed compression mode as earlier described. This switch introduces compressed feed air into the feed end of adsorber 17, while product gas continues to flow from storage tank 39 into the adsorber, thereby providing dual end repressurization of the adsorber. This step continues as the pressure in the adsorber increases and the pressure in the gas storage tank decreases.

At time $t_4$ (4 seconds after $t_3$), the dual end repressurization step automatically terminates and the feed repressurization step begins when the differential pressure between gas storage tank 39 and adsorber 17 drops below 10 psid. This terminates the flow of oxygen product gas from tank 39 through check valve 43 and into adsorber vessel 17 as check valve 43 closes, and feed repressurization proceeds until the adsorber pressure reaches the initial feed pressure of 17.0 psia. The pressure in storage tank 39 continues to decrease, but at a slightly slower rate, as final oxygen product gas withdrawal continues through line 31. At time $t_f$ (6 seconds after $t_4$), the differential pressure between adsorber 17 and tank 39 exceeds 0.25 psid, and flow through check valve 23 begins. At this point the cycle repeats beginning with the air feed step.

While specific cycle step durations and pressures are described in this Example, other cycle step durations and pressures can be used depending on required product rate and purity, adsorber size, ambient temperature, and type of adsorbent. The relative durations and pressures in the main segments of the PSA cycle in FIG. 2, namely the air feed step ($t_0$–$t_1$), the evacuation steps ($t_1$–$t_3$), and the repressurization steps ($t_3$–$t_f$), are controlled by the switch times of two-way four-port valve 7. The relative duration of the evacuation step ($t_1$–$t_2$), the evacuation and purge step ($t_2$–$t_3$), the dual end repressurization step ($t_3$–$t_4$), and the product repressurization step ($t_4$–$t_f$) are controlled by the selection of the differential pressures at which check valves 23 and 43 open. For example, selecting a higher value of this differential pressure for check valve 43 would lengthen the evacuation step and the product repressurization step, and would shorten the dual end repressurization step and the evacuation and purge step. Conversely, selecting a lower value of this differential pressure for check valve 43 would shorten the evacuation step and the product repressurization step, and would lengthen the dual end repressurization step and the evacuation and purge step.

The process of the present invention described above is carried out in a simple system which utilizes a single two-way four-port valve for controlling gas flow between an adsorber vessel and a blower, and the blower is used for the introduction of feed gas into the adsorber and the evacuation of gas from the adsorber. The control of gas flow in either direction between the adsorber vessel and the product gas storage tank is accomplished automatically by two check valves installed in parallel between the vessel and the tank. The system thus functions with only two mechanical drivers—one for operating the two-way four-port valve and one for operating the blower. The check valves between the adsorber and the gas storage tank are activated directly and automatically by the gas differential pressure between the adsorber and the storage tank. The design of the present PSA system thus reduces capital cost and increases operating reliability when compared with previous systems which require the controlled mechanical opening and closing of numerous valves to direct gas flow during the various PSA steps.

Since only one actuated valve and one blower are required, the PSA system is simple and compact. The single two-way four-port valve is controlled by a single timer, which in combination with the check valves eliminates the need for a more complex microprocessor to control the cycle.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A pressure swing adsorption process for the separation of a pressurized feed gas containing at least one more strongly adsorbable component and at least one less strongly adsorbable component which comprises the steps of:

(a) introducing the pressurized feed gas at a feed pressure into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, and introducing at least a portion of the adsorber effluent gas into a gas storage tank;

(b) terminating introduction of the pressurized feed gas into the adsorber vessel and depressurizing the adsorber vessel by evacuating gas from the feed end of the adsorber vessel;

(c) continuing to evacuate gas from the feed end of the adsorber vessel while simultaneously introducing stored adsorber effluent gas from the gas storage tank into the product end of the adsorber vessel until the pressure in the adsorber vessel reaches a minimum adsorber pressure;

(d) terminating the evacuating of gas from the feed end of the adsorber vessel and repressurizing the adsorber vessel from the minimum adsorber pressure to an intermediate pressure by introducing pressurized feed gas into the feed end of the adsorber vessel while continuing to introduce stored adsorber effluent gas from the gas storage tank into the product end of the adsorber vessel;

(e) further repressurizing the adsorber vessel to the feed pressure by continuing to introduce pressurized feed gas into the feed end of the adsorber vessel; and (f) repeating steps (a) through (e) in a cyclic manner.

2. The method of claim 1 wherein a portion of the adsorber effluent gas enriched in the less strongly adsorbable component is withdrawn as a final product gas during step (a).

3. The method of claim 1 wherein a portion of the stored adsorber effluent gas enriched in the less strongly adsorbable component is withdrawn from the gas storage tank as a final product gas during step (a).

4. The method of claim 1 wherein a portion of the stored adsorber effluent gas from the gas storage tank is withdrawn as a final product gas during steps (b), (c), (d), and (e).

5. The method of claim 1 wherein the feed gas is air, the more strongly adsorbable component is nitrogen, and the less strongly adsorbable component is oxygen.

6. The process of claim 1 wherein the solid adsorbent is selected from the group consisting of monovalent or bivalent cation-exchanged zeolites having type A, type X, or mordenite structure.

7. The process of claim 1 wherein during step (a) the adsorber effluent gas flows through a first check valve prior to introducing adsorber effluent gas into the gas storage tank, and wherein no gas flows from the gas storage tank through the first check valve into the adsorber vessel during steps (b), (c), (d), and (e).

8. The process of claim 7 wherein during steps (c) and (d) gas flows from the gas storage tank through a second check valve and into the adsorber vessel, and wherein no adsorber effluent gas flows through the second check valve during steps (a), (b), and (e).

9. The process of claim 1 wherein the minimum adsorber pressure is below atmospheric pressure.

10. A pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) blower, valve, and piping means for (1) introducing the feed gas from the blower into the feed end of the adsorber vessel and (2) withdrawing an evacuation gas from the feed end of the adsorber vessel through the blower;

(c) piping means for withdrawing an adsorber effluent gas enriched in the less strongly adsorbable component from the product end of the adsorber vessel;

(d) a gas storage tank for holding a portion of the adsorber effluent gas withdrawn from the product end of the adsorber vessel;

(e) piping means for introducing the portion of adsorber effluent gas into the gas storage tank and for transferring adsorber effluent gas from the gas storage tank into the adsorber vessel;

(f) a first check valve which allows adsorber effluent gas to flow into the gas storage tank only when the differential pressure between the adsorber vessel and the gas storage tank is equal to or greater than a differential opening pressure of the first check valve;

(g) a second check valve which allows gas to flow from the gas storage tank into the adsorber vessel only when the differential pressure between the gas storage tank and the adsorber vessel is equal to or greater than a differential opening pressure of the second check valve; and (h) piping means for withdrawing at least a portion of the adsorber effluent gas as a final product gas enriched in the less strongly adsorbable component.

11. The system of claim 10 wherein the valve means of (b) comprises a two-way four-ported valve which in a first valve position allows gas to flow in sequence through a feed inlet/outlet line, through the valve, through a blower suction line, through the blower, through a blower discharge line, through the valve, through a line connected to the adsorber vessel feed end, and into the adsorber vessel, and in a second valve position allows gas to flow in sequence from the adsorber vessel, through the line connected to the adsorber vessel feed end, through the valve, through the blower suction line, through the blower, through the blower discharge line, through the valve, and through the feed inlet/outlet line.

12. The system of claim 10 wherein the opening differential pressure of the first check valve is between about 0.05 psid and about 1.0 psid.

13. The system of claim 10 wherein the opening differential pressure of the second check valve is between about 2 psid and about 10 psid.

14. The system of claim 10 which further comprises a flow control valve connected to the piping means for withdrawing at least a portion of the adsorber effluent gas as a final product gas enriched in the less strongly adsorbable component.

15. The system of claim 14 wherein the feed gas is air and the feed inlet/outlet line is in flow communication with the atmosphere.

* * * * *